W. W. LYONS.
PINCERS, PLIERS, AND THE LIKE.
APPLICATION FILED SEPT. 7, 1911.
1,022,489.
Patented Apr. 9, 1912.
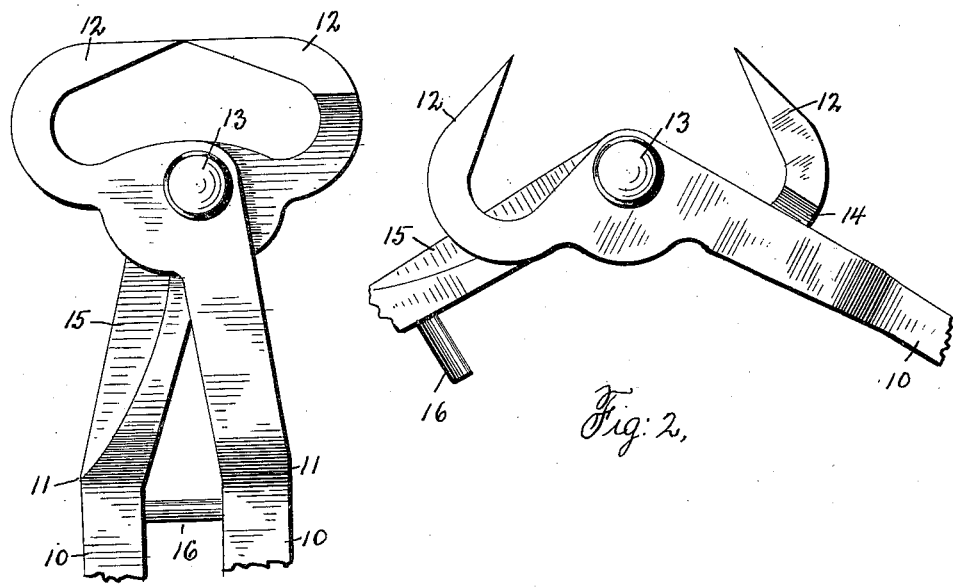
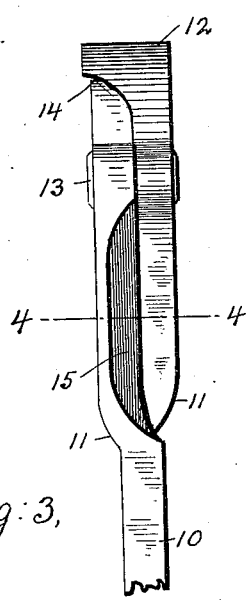
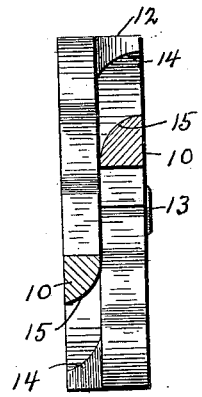
Witnesses:
Thomas T. Seelye.
Arthur G. Dannell,
William W. Lyons, Inventor,
By his Attorney,
W. P. Hutchinson,

UNITED STATES PATENT OFFICE.

WILLIAM W. LYONS, OF NEWARK, NEW JERSEY, ASSIGNOR TO HELLER TOOL COMPANY, OF NEWARK, NEW JERSEY, A CORPORATION OF NEW JERSEY.

PINCERS, PLIERS, AND THE LIKE.

1,022,489.  Specification of Letters Patent.  Patented Apr. 9, 1912.

Application filed September 7, 1911. Serial No. 648,161.

*To all whom it may concern:*

Be it known that I, WILLIAM W. LYONS, of the city of Newark, county of Essex, and State of New Jersey, have invented a new and useful Improvement in Pincers, Pliers, and the Like, of which the following is a full, clear, and exact description:

My invention relates to improvements in pincers, pliers, and similar tools having jaws which open and close, and which are operated by crossing handles pivoted together near the jaws.

My invention as illustrated is especially adapted for use as a farrier's pincers, although it will be understood that my improvements can be applied to other analogous tools.

The object of the invention is to produce a tool of this character having jaws which can be opened unusually wide so as to take in a large object, or in the case of a farriers pincers, so that the cutting portions of the jaws can be used to advantage in paring the hoof of an animal.

In carrying out my invention, I provide the jaws with inclined rear surfaces and correspondingly incline or cut away the inner portions of the handles where they would naturally contact with the jaws, so that the inclined portions of the jaws and handles will coincide when the pincers are opened, and thus provide for a very wide opening. Incidentally I carry the pivot of the jaws well forward toward the cutting edges, thus bringing the fulcrum near the cutting part so as to produce a powerful tool.

Another object of my invention is to produce a structure which will permit the wide opening of the jaws and provide for the pivot near the edges of the instrument, and at the same time produce a tool which is relatively thin and symmetrical, and which can be conveniently and economically made.

Reference is to be had to the accompanying drawings forming a part of this specification, in which similar reference characters indicate corresponding parts in all the views.

Figure 1 is a broken side elevation of the instrument with the jaws closed. Fig. 2 is a broken side elevation with the jaws opened. Fig. 3 is a broken edge view of the instrument with the jaws closed, and Fig. 4 is a cross section on the lines 4—4 of Fig. 3.

The instrument illustrated is a farrier's pincers and is provided with the customary handles 10 which are opened and closed to operate the jaws, and these handles are preferably bent slightly outward at 11 to provide for clearance, and they merge at the ends in jaws 12 which in the present instance are cutting jaws having meeting cutting edges adapted to pare a hoof, cut nails, wire, or other things. The jaws are curved so that the pivot 13 which unites them is carried well forward, so that a powerful tool can be produced. The important feature of the invention, however, lies in the construction of the rear of the jaws and the parts of the handles which would naturally meet the jaws when the latter are opened. To provide for the wide opening the jaws 12 are on the back sides inclined from one edge toward the handle, as shown at 14, and the ends of the handles near the pivots of the jaws are on the inner sides beveled away or inclined as shown at 15, so that when the jaws are open, the beveled or inclined part 15 of the handles will fit against the correspondingly inclined portions 14 of the jaws. It will be seen that if the jaws were left square at the back and the handles of the usual shape, the parts would strike when the tool was opened, and a much narrower opening would be permitted than in the present instance.

I am aware that heretofore efforts have been made to provide for a wide opening usually by bending the jaws to a peculiar shape, and correspondingly bending the handles, but this makes an ugly tool; whereas by following the construction above described and illustrated, a symmetrical thin tool is provided which can be made as strong as any tool, and permits of an exceptionally wide opening, while the construction shown also provides for a tool which can be very economically made.

In the drawings I have shown one of the handles 10 provided with an abutment 16 which contacts with the opposing handle as the edges of the jaws meet, so that no unnecessary strain is produced on the cutting edges. This feature, however, I do not claim as novel.

It will of course be understood that the parts 14 and 15 can be given different degrees of inclination or curvature, but the essential thing is to have them cut away or beveled or inclined in the general manner described to provide for the wide opening of the jaws.

I have shown and described a farrier's pincers having the jaws 12 provided with cutting edges, but it will of course be understood that the meeting portions of the jaws can be given any desired configuration and that the tool can be made for other purposes, without in the least altering the principle of the invention, which lies as above stated, in the formation of the jaw backs and the opposed portions of the handles.

I claim:—

A tool of the kind described comprising two substantially straight pivoted crossing handles, terminating at their upper ends in opposed jaws of greater width than the thickness of the handles, the inner surfaces of the jaws above the pivot being inclined, and the outer edges of the inner surfaces of those parts of the handles which come opposite the jaws when the latter are opened, being correspondingly beveled to permit wider opening of the jaws, while the points of union with the handles are straightened.

WILLIAM W. LYONS.

Witnesses:
FRED H. STOUT,
CHAS. W. TEN EYCK.

Copies of this patent may be obtained for five cents each, by addressing the "Commissioner of Patents, Washington, D. C."